United States Patent [19]

Terazono et al.

[11] 4,368,518

[45] Jan. 11, 1983

[54] CAGE POSITION DETECTING APPARATUS

[75] Inventors: Narihiro Terazono; Ryuichi Kajiyama, both of Inazawa, Japan

[73] Assignee: Mitsubishi Denki Kabushiki Kaisha, Tokyo, Japan

[21] Appl. No.: 186,128

[22] Filed: Sep. 11, 1980

[30] Foreign Application Priority Data

Oct. 9, 1979 [JP] Japan ........ 54-130288
Oct. 9, 1979 [JP] Japan ........ 54-130289

[51] Int. Cl.$^3$ ........ B66B 3/02; G06F 15/20

[52] U.S. Cl. ........ 364/433; 364/200; 187/29 R

[58] Field of Search ........ 364/433, 200, 900; 187/29 R

[56] References Cited

U.S. PATENT DOCUMENTS

| | | | |
|---|---|---|---|
| 3,321,747 | 5/1967 | Adamson | 364/200 |
| 3,765,510 | 10/1973 | Richmon | 187/29 R |
| 3,810,116 | 5/1974 | Prohofsky | 364/200 |
| 4,096,560 | 6/1978 | Footh | 364/200 |
| 4,124,103 | 11/1978 | Otto et al. | 187/29 R |
| 4,134,476 | 1/1979 | Zolnerovich, Jr. et al. | 187/29 R |
| 4,141,435 | 2/1979 | Satoh | 187/29 R |
| 4,142,609 | 3/1979 | Tachino | 187/29 R |
| 4,263,987 | 4/1981 | Satoh et al. | 187/29 R |
| 4,271,402 | 6/1981 | Kastura et al. | 364/424 X |

*Primary Examiner*—Edward J. Wise
*Attorney, Agent, or Firm*—Oblon, Fisher, Spivak, McClelland & Maier

[57] ABSTRACT

A cage position detecting apparatus operates the data for the present position of the cage by a computer. The data for the final floor memorized in a read only memory are used as the data for the present position when the cage stops at the final floor to output a signal from a position detector placed in a hatchway. The cage is run to the final floor when the position detector corresponding to the final floor does not output a signal in the condition that the operated data for the present floor indicates the final floor. The operated data for the present position are memorized in a memory device actuated by the emergency power source to give the data being coincident with the actual cage position even though the operated data for the present position of the cage are changed by service interruption. The data for the condition of the cage just before the service interruption are memorized in the memory device. After releasing the service interruption, the memorized data for the condition of the cage are read out. If the cage is stopping at the time of the service interruption, the memorized cage position is given as the present cage position. If the cage is running at the time of the service interruption, the cage is forcibly run to the final floor and the data for the final floor memorized in the read only memory are memorized in the memory device to use the data as the operated data for the cage position. The operated data for the cage position deviated by the service interruption can be easily corrected. The operated data for the cage position can be always coincident with the actual cage position by the simple structure.

3 Claims, 12 Drawing Figures

CAGE POSITION DETECTING APPARATUS

BACKGROUND OF THE INVENTION

1. Field of the Invention

The present invention relates to an improvement of the cage position detecting apparatus for an elevator which is controlled by an operation of a computer.

2. Description of the Prior Arts

The detection of the cage position is indispensable for the operation of the elevator and is carried out by a floor selector.

Various floor selectors have been proposed. Recently, it has been considered to utilize the operation of a computer. In this system, floor pass switches are placed on each floor to indicate the present position of the cage by the addition and subtraction for the floors through which the cage is passed.

The cage position signals obtained by the floor selectors are used for indicating the cage position on the floors and in the cage and for the decision of the stopping of the cage.

When there is an erroneous input for the outputs of the floor pass switches, certain deviation is given between the operated cage position and the actual cage position, whereby the continued movement is not possible. There is a possibility to give an incorrect data for the cage position memorized by the operation, especially in the case of the service interruption. Even though the service interruption is released, it is impossible to carry out the normal operation. Thus, in such cases, the output of the floor selector is calibrated to the actual cage position. For example, when the output of the floor selector designates the final end floor (the top floor or the bottom floor), the cage is run to the final floor so as to be coincident the output with the cage position. It is also possible to be coincident the output with the cage position by actuating the floor selector in the condition of stopping the cage.

It is, however, difficult to prevent the increase of the costs caused by the consumption of excess electric power and the requirement of the complicated circuit.

SUMMARY OF THE INVENTION

An object of the present invention is to improve the abovementioned disadvantages and to provide a cage position detecting apparatus which has a simple structure to calibrate the cage position.

The other object of the present invention is to provide a cage position detecting apparatus which can operate to find the actual cage position even during a service interruption.

The foregoing and other objects of the present invention have been attained by operating the data for the present cage position by a computer to input the floor data corresponding to the final floor memorized in a read-out only memory as the data for the present cage position when the cage stops at the final floor and to output from a position detector placed in a hatchway and to run the cage toward the final floor when the position detector corresponding to the final floor does not output a signal even though the operated data for the present cage position indicates the final floor. The data for the present cage position are memorized in the memory device actuated by an emergency time.

The condition of the running of the cage just before the service interruption is memorized in the memory device to read out the data for the running condition after releasing the service interruption and the memorized data for the cage position are given as the data for the present cage position in the case of the stopping of the cage before the service interruption whereas the cage is forcibly run to the final floor in the case of the running of the cage to memorize the data for the final floor recorded in the read only memory into the memory device so as to use the data as the operated data for the cage position.

DETAILED DESCRIPTION OF THE PREFERRED EMBODIMENTS

Figure 1:
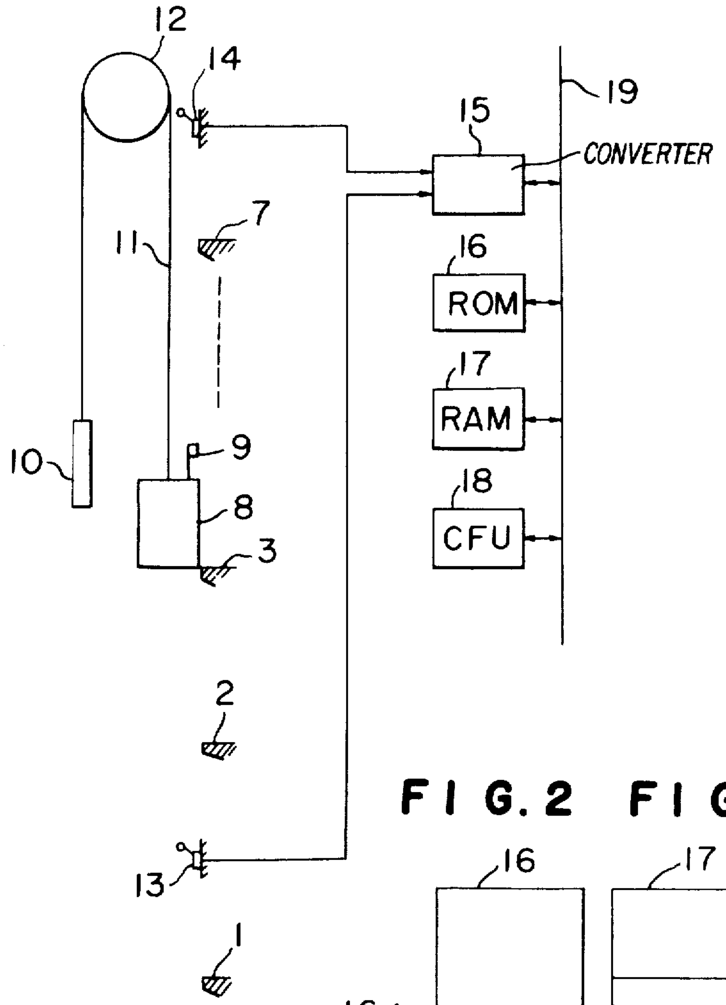
FIG. 1 is a schematic view of one embodiment of the cage position detector.
Figure 2:
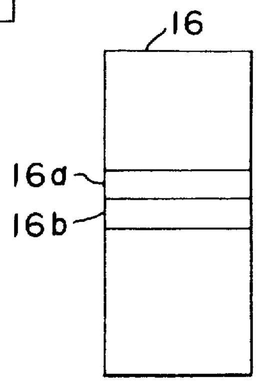
FIG. 2 shows the memorized condition of the read only memory.
Figure 3:
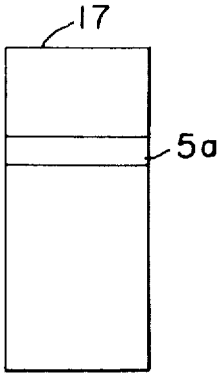
FIG. 3 shows the memorized condition of the write and read enable memory of FIG. 1.

Referring to FIGS. 1 to 3, the optimum embodiment of the present invention will be illustrated.

In FIG. 1, the references (1) to (7) designate the first to seventh floors; (8) designates a cage of an elevator; (9) designates a cam equipped with the cage (8); (10) designates a counter weight; (11) designates a main rope for connecting the cage (8) to the counter weight (10); (12) designates driving sheave of a hoisting winch (not shown); (13) designates a position detector having a switch which is driven by a cam (9) when the cage (8) in the hatchway is stopped at the first floor (1) as the bottom floor; (14) designates a position detector corresponding to the seventh floor (7) as the top floor; (15) designates a converter which converts the input into the data for the computor; (16) designates a nonvolatile non-breakable read only memory (ROM) which memorizes the data of the top floor position **(16*a*) and the bottom floor position (16*b*), (FIG. 2); (17) designates a write and read enable memory (RAM) which memorizes the present position of the cage (8) (FIG. 3); (18) designates a central processing unit; and (19)** designates a generating lines for the address path and the data path.

The data for the present position of the cage (8) are operated by the central processing unit (18) to write in the data as the data for the present cage position **(5*a*) in the memory address of RAM(17)**. The data are used as the cage position signal to control the operation of the cage. This is well known and will not be described in detail.

When the cage (8) stops at the first floor (1), the cam (9) is interlocked with the position detector (13) to output a signal from the position detector (13). The output is fed through the converter (15) to the central processing unit (18) and operated in the unit whereby the data for the bottom position (16*b*) are read out from ROM (16) and are written in the memory address of the RAM (17) as the present position (5*a*). When the cage (8) stops at the seventh floor (7), the cam (9) interlocks with the position detector (14) to output from the position detector (14). The data for the top floor position (16*a*) are read out from ROM (16) by the similar operation and are written in the memory address of RAM (17) as the data for the present position (5*a*). Thus, when the cage (8) stops at the final floor, even though the data for the present cage position in RAM (17) are not correct, the data are correctly rewritten so that the output of the floor selector coincides with the actual cage position.

When the cage (8) is stopped at a middle floor such as the third floor (3) in FIG. 1, but the data for the present cage position (5*a*) in RAM (17) indicate the first floor, certain calibration is carried out by the operation of the central processing unit (18). That is, the cage (8) is forcibly run to the first floor by a circuit (not shown). When the data for the present position (5*a*) of RAM (17) indicate the seventh floor (7), the cage (8) is forcibly run to the seventh floor (7). Until stopping the cage at the first or seventh floor (1) or (7), the operation of the data for the present cage position of the central processing unit (18) is stopped. When the cage (8) stops at the first floor (1) or the seventh floor (7) to output from the position detector (13) or (14), the data of the first floor (1) or the seventh floor (7) are written in RAM (17) as the data for the present cage position (5*a*). Thus, the output of the floor selector is coincident with the actual cage position. Even though the operation of the data for the present cage position is performed by the central processing unit (18) during the forcible running toward the final floor, if the cage (8) stops at the final floor, the data for the present cage position (5*a*) in RAM (17) are rewritten to be the final floor to complete the calibration.

Figure 4:
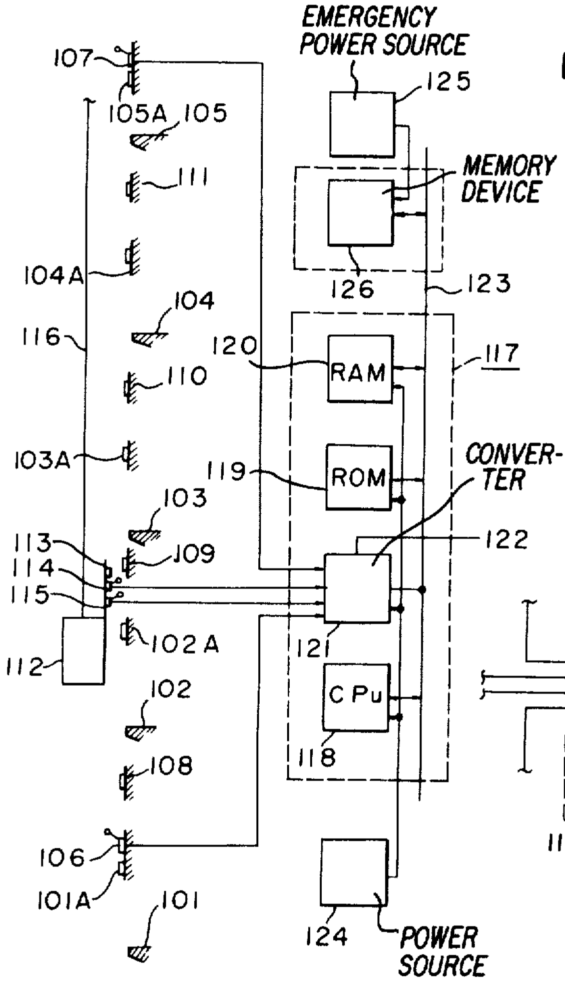
FIG. 4 shows the block diagram of another embodiment of the cage position detecting apparatus of the present invention.

Referring to FIG. 4, the other optimum embodiment of the present invention will be illustrated.

In FIG. 4, the reference numerals (101) to (105) designate the first to fifth floors; (101A) to (105A) designate cams placed at the first to fifth floors in the hatchway; (106) designates the bottom floor detector comprising a switch which is placed at the bottom floor (first floor); (107) designates a top floor detector placed at the top floor (fifth floor); (108) to (111) designate cams placed between the first and second floors (101), (102), between the second and third floors (102), (103), between the third and fourth floors (103), (104) and between the fourth and fifth floors (104), (105); (112) designates a cage; (113) designates a cam which is equipped with the cage (112) and is interlocked with the bottom floor detector (106) at the bottom floor (101) and is interlocked with the top floor detector (107) at the top floor (105); (114) designate floor detector comprsing a switch which is interlocked with the cams (101A) to (105A) when the cage (112) is at each of the first to fifth floors (101), (102), (103), (104), (105); (115) designates floor pass detector which is interlocked with the cams (108) to (111) when the cage (112) passes the floors; (116) designates a main rope for the cage; (117) designates a position detector of a computer; (118) designates a central processing unit; (119) designates a read only memory (ROM) which memorizes the bottom floor position and the top floor position; (120) designates a write and read enable memory (RAM) which memorizes the data for the present cage position in the memory address; (121) designates a converter for converting the input into the data for the computer (117); (122) designates mode signal which is "H" in the automatic operation of the cage (112) and "L" in the manual operation; (123) designates a generating line for the address path and the data path; (124) designates a main power source; (125) designates an emergency power source; (126) designates a memory device for memorizing the data for the present position of the cage (112).

The operation of the embodiment will be illustrated.

The floor pass detector (115) is interlocked with the cams (108) to (111) by each passing of the cage (112) through floors and the output is received through the converter (121) and the data of the present position of the cage (112) is operated by the central processing unit (118) to be written in RAM (120). In the ascending of the cage, the datum for one floor is added to the momorized data of RAM (120). In the descending of the cage, the datum for one floor is subtracted from the memorized data of RAM. This is used as the cage position signal for controlling the operation of the cage. This is well-known and will not described in detail.

When the cage (112) stops at the bottom floor (101), the cam (113) interlocks with the bottom floor detector (106) whereby the bottom floor detector (106) outputs a signal. The output is received by the central processing unit (118) and the data for the bottom floor position are read out from ROM (119) and are written in RAM (120) as the data for the present cage position. When the cage (112) stops at the top floor (105), the cam (113) interlocks with the top floor detector (107). In the same manner, the top floor detector (107) outputs a signal and the data of the top floor position are read out from ROM (119) and are written in RAM (120) as the present cage position. Thus, even though the data for the present position of the cage (112) memorized in RAM (120) are not correct when the cage (112) stops at the final floor, the data are corrected to allow the indicated cage position to coincide with the actual cage position.

On the other hand, the memory device (126) is actuated by the emergency power source (125) to memorize the data the same as the cage position memorized in RAM (120).

When the service interruption of the main power source (124) is released, the condition of the outer signal is detected for a predetermined period (1 second). For example, when the floor detector (114) does not interlock with any cam (101A) to (105A) and the operation state signal (122) is "H" (the cage (112) runs at the service interruption), the data are corrected by the central processing unit (118). The cage (112) is forcibly run to the bottom floor by the circuit (not shown). When the cage (112) stops at the bottom floor (101), the cam (113) interlocks with the bottom floor detector (106) whereby the data for the bottom floor position are read out from ROM (119) to rewrite the memory of the RAM (120) and the data of the memory element (126) are also corrected. When the floor detector (114) interlocks with the cam (102A) in the service interruption, and the operation state signal (122) is "H" (the cage (112) stops at the service interruption), the data memorized in the memory device (126) are used as the cage position signal. Even though the data memorized in RAM (120) are changed by the service interruption, the data of the memory element (126) maintain the data before the service interruption and accordingly, the data being coincident with the actual cage position can be obtained. In such case, the forcible running of the cage (112) is not performed. When the operation state signal (122) is "L" (the cage (112) is in the manual operation at the service interruption), the correction of the data of RAM (120) and the memory element (126) and the forcible running of the cage (112) are not performed, because the speed is slow in the manual operation. Even though the service interruption is resulted during the running, the deviation between the operated data for the cage position and the actual cage position is remarkably small.

Figure 5:
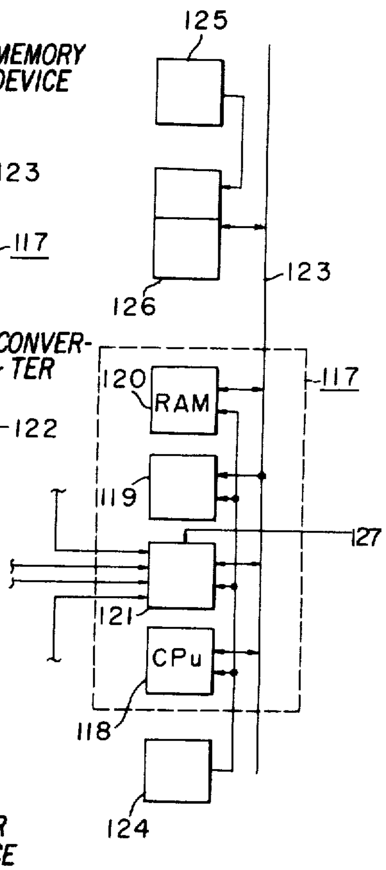
FIG. 5 shows the block diagram of another embodiment.

FIG. 5 shows the other embodiment of the present invention. The running signal (127) is "H" during running the cage (regardless of automatic and manual operation) and is "L" during the stop. The signal is memorized in the memory device (126). The other structure is the same as that of FIG. 4.

The condition of the running signal (127) is memorized in the memory device (126). When the service interruption of the main power source (124) is released, the data of the memory element are read out. When the running signal (127) before the service interruption is "L", the operated cage position is not deviated and accordingly, the data for the cage position memorized in the memory element (126) are used.

When the running signal (127) is "H", the operated cage position may be deviated because of the service interruption during the running. In such case, the cage (112) is forcibly run to the final floor when the service interruption is released. The data for the final floor position memorized in ROM (119) at the final floor are written in the memory device (126).

Figure 6:
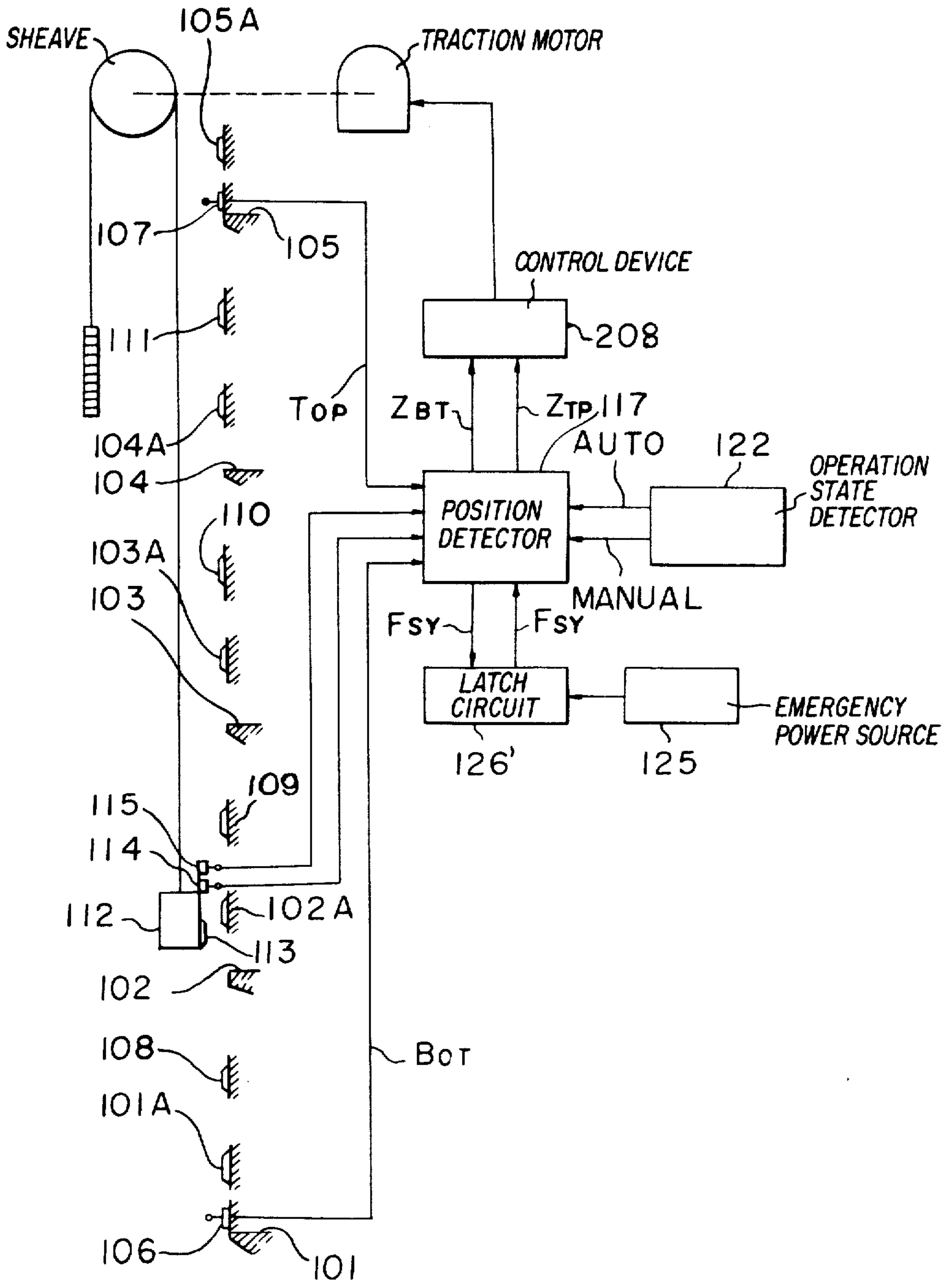
FIG. 6 shows the block diagram of a part of the elevator system comprising the cage position detecting apparatus shown in FIG. 4.

Referring to FIG. 6, the embodiment of FIG. 4 will be described in detail.

In FIG. 6, the same references designate identical or corresponding parts shown in FIG. 4 and will not described in detail.

Figure 7:
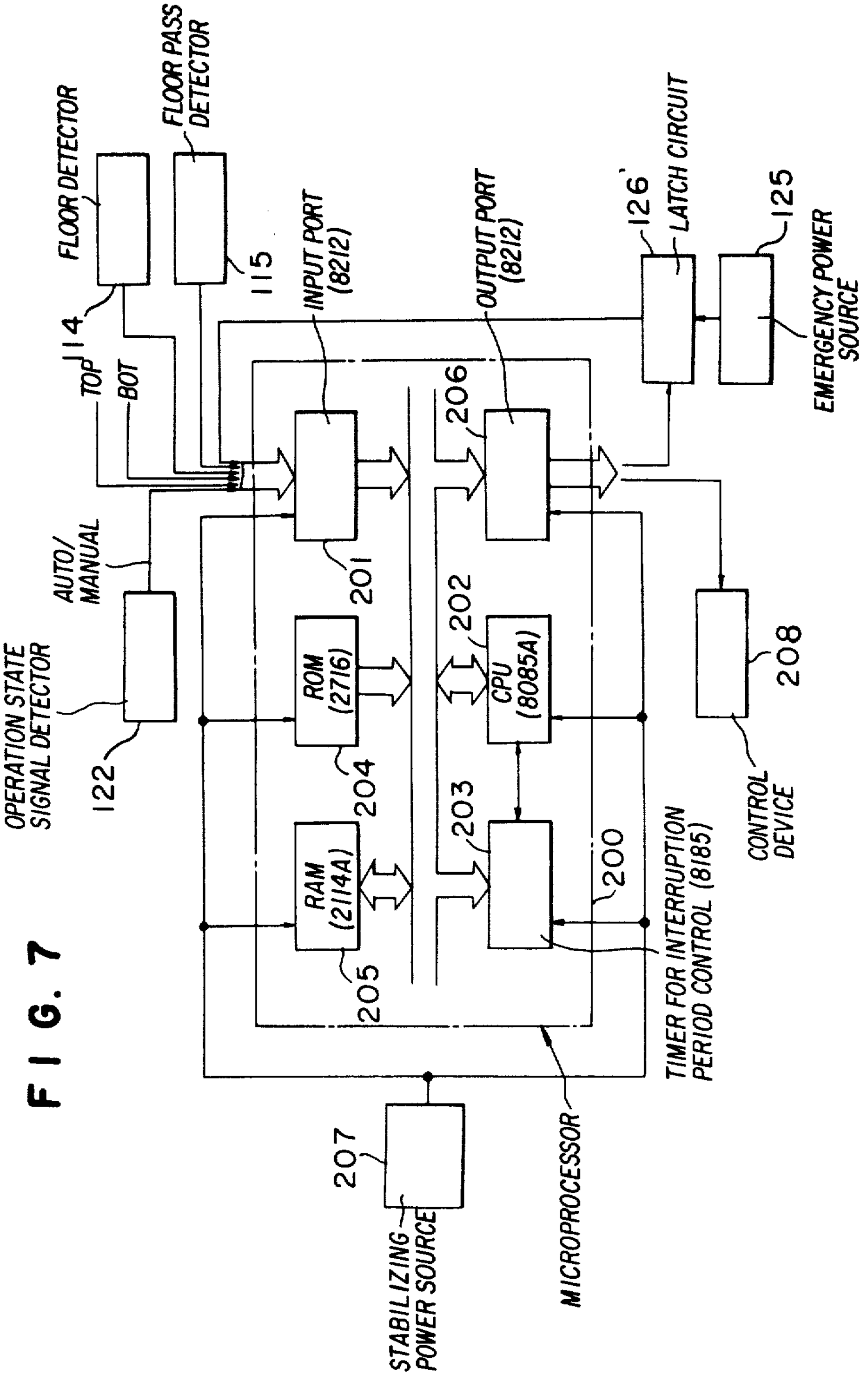
FIG. 7 is a block diagram of the cage position detecting apparatus shown in FIG. 6 using the microprocessor.

FIG. 7 is the block diagram of the position detector (117).

The position detector comprises a microprocessor (200) as 8085 manufactured by Intel Co. which can be the other microprocessor or a digital computer. The microprocessor (200) comprises an input port (201) (Intel 8212), a central processing unit (CPU) (202) (Intel 8085A), a timer for interruption period control (203) (Intel 8155), a read only memory (ROM) (204) (Intel 2716), a write and read enable memory (RAM) (205) (Intel 2114A) and the output port (206) (Intel 8212). The reference (207) designates 5 V stabilizing power source to feed the power to the devices of the microprocessor (200); and (122) designates an operation state detector to output the automatic operation signal (AUTO) during the automatic operation and to output the manual operation signal (MANUAL) during the manual operation; (126') designates a latch circuit using CMOS which is actuated by the emergency power source (125).

The operation of the embodiment will be illustrated.

The floor pass detector (115) interlocks with the cams (108) to (111) at each time passing the cage through the floors. The output is fed through the input port (201) into the microprocessor (200). The data for the present floor (FSY) are operated by the floor processing program memorized in ROM (204) and the data are memorized in RAM (205).

At each output of the signal from the floor pass detector (115), the datum for one floor is added to the data of the present floor (FSY) memorized in RAM (205) during the ascending to memorize the data in RAM (205) whereas the datum for one floor is subtracted from the data of the present floor (FSY) in RAM (205) during the descending to memorize the data in RAM (205). This is used as the cage position signal to control the cage.

When the cage (112) stops at the bottom floor (101), the bottom floor detector (106) is interlocked with the cam (113) to output the bottom floor signal (BOT). The signal is fed into the microprocessor (200) and the data for the bottom floor memorized in ROM (204) are read out and are written in RAM (205) as the data for the present floor (FSY).

When the cage (112) stops at the top floor (105), the top floor detector (107) is interlocked with the cam (113) to output the top floor signal (TOP). In the same manner, the data for the top floor are read out from ROM (204) and are written in RAM (205) as the data for the present floor (FSY).

When the cage (112) stops at the bottom floor or the top floor, even though the data for the present floor (FSY) memorized in RAM (205) are not correct, the data are corrected as mentioned above to be coincident the data for the cage position operated by the position detector (117) with the actual cage position.

When the cage (112) stops at a middle floor such as the third floor (103) and the data for the present floor (FSY) indicate the data for the bottom floor, the calibration is performed by the deviation correcting program memorized in ROM (204). That is, the signal ZBT for running forcibly the cage (112) to the bottom floor is output to the control device (208). When the data for the present floor (FSY) memorized in RAM (205) indicate the data for the top floor, the signal ZTP for running forcibly the cage (112) to the top floor is output by the correcting program to the control device (208). Thus, the cage (112) runs to the bottom floor (101) or the top floor (105). Until reaching the cage (112) to the bottom floor (101) or the top floor (105), the operation for the present floor by the floor processing program is stopped. When the cage (112) stops at the bottom floor (101) or the top floor to output the signal (BOT) or (TOP) by the bottom floor detector (106) or the top floor detector (107) which is interlocked with the cam (113), the data for the bottom floor (101) or the top floor (105) are written in RAM (205) to be coincident the data for the present floor (FSY) memorized in RAM (205) with the actual cage floor. On the other hand, the data for the present floor (FSY) are output through the output port (206) each change of the data to memorize the data in the latch circuit (126').

When the service interruption of the stabilizing power source (207) is released, the condition of the outer signal just after the recovery of the power source is detected. For example, if the floor detector (114) is not interlocked with any cam (101A) to (105A) and the automatic operation signal (AUTO) is output, it is considered that the cage (112) is running at the service interruption. There is high possibility that the data for the present floor (FSY) memorized in the latch circuit (126') are deviated from the actual cage position. Therefore, the correction is performed by the microprocessor (200). The signal ZBT is output by the deviation calibrating program to the control device (208) to run forcibly the cage (112) to the bottom floor. When the cage (112) stops at the bottom floor (101), the cam (113) is interlocked with the bottom floor detector (106) to output the signal (BOT). The data for the bottm floor are read out from ROM (204) to rewrite the data for the present floor (FSY) in RAM (205) and to correct the data in the latch circuit (126').

When the floor detector is interlocked with any cam (102A) to (104A) at the middle floor and the automatic operation signal AUTO is output at the time releasing the service interruption, it is considered that the cage (112) stops at the middle floor at the service interruption. Therefore, the data for the present floor memorized in the latch circuit (126') are reliable data and the data are input to memorize the RAM (205) as the data for present floor (FSY) to use the data for the following operation.

The data for the present floor (FSY) operated by the microprocessor (200) coincide with the actual cage floor whereby the running of the cage (112) to the bottom floor for the correction is not performed. When the manual operation signal (MANUAL) is output at the time releasing the service interruption, it is considered that the cage (112) is in the manual operation at the service interruption. In such case, even though the service interruption is caused during the running of the cage, the cage speed in the manual operation is usually slow and the distance for the movement of the cage (112) is short, whereby the data for the floor memorized in the latch circuit (126') coincide with the actual cage position at the time releasing the service interruption. Thus, the data of the latch circuit (126') are input to memorize in RAM (205) as the data for the present floor (FSY). It is unnecessary to run forcibly to the bottom floor.

Figure 8:
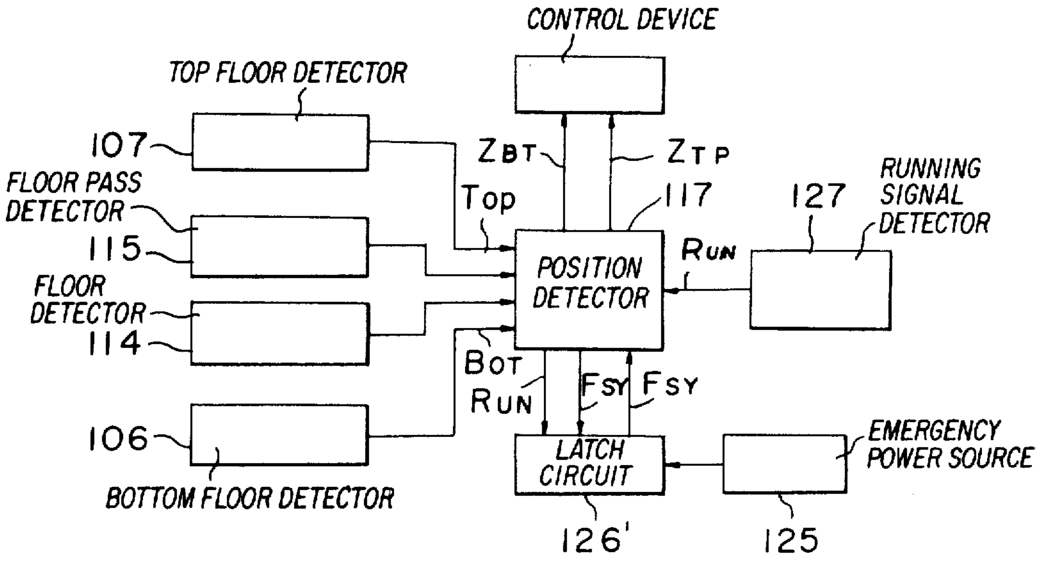
FIG. 8 is a block diagram of the detail of the embodiment shown in FIG. 5.
Figure 9:
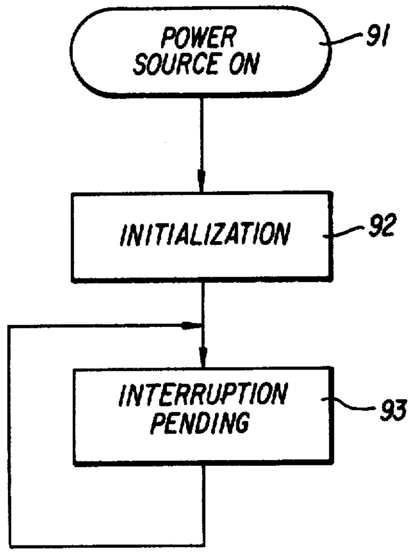
FIGS. 9–12 are flow charts of the program listings of the position detector of FIGS. 5, 6 and 7.
Figure 10:
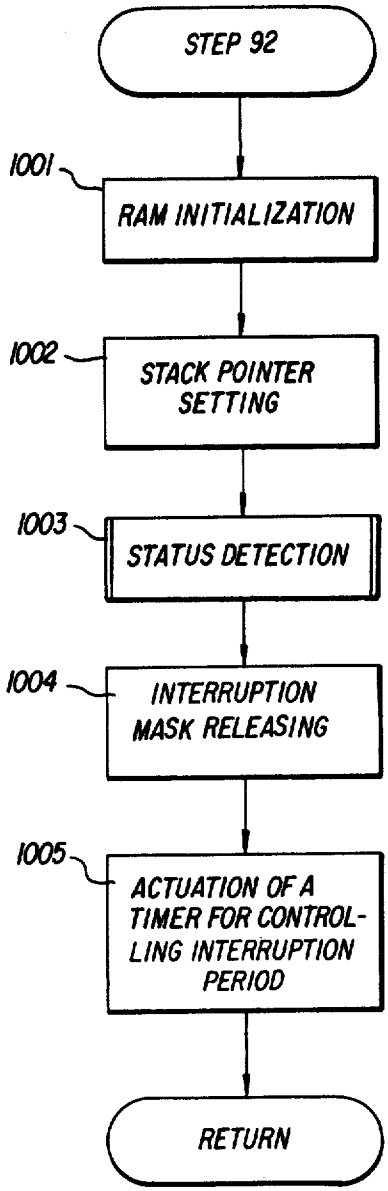
Figure 11:
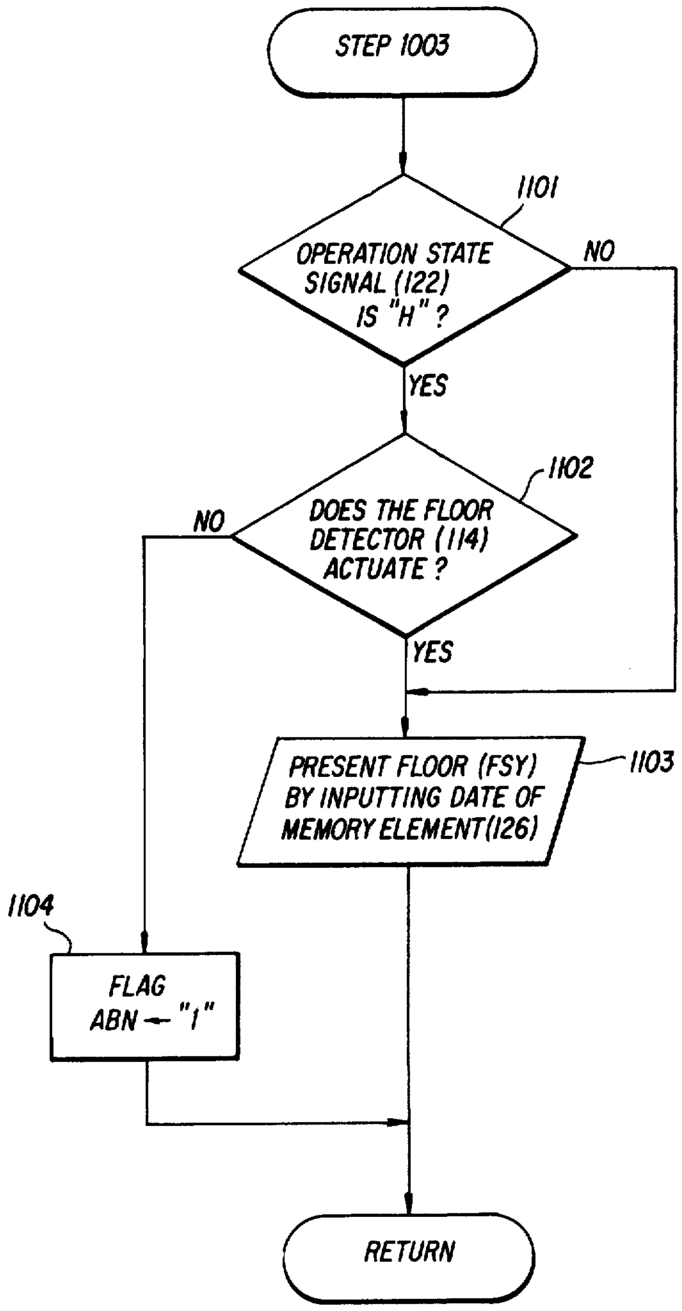

Referring to FIG. 8, the embodiment of FIG. 5 is further illustrated in detail.

The running condition detecting circuit (127) output the running signal (RUN) during the running of the cage (112) and does not output such signal during the stopping of the cage. The condition of the running signal (RUN) is memorized together with the data for the present floor (FSY) of RAM (120) in the latch circuit (126') as the memory device.

When the stabilizing power source is recovered to be the normal state after releasing the service interruption, the data of the latch circuit (126') are read out to find the condition of the running of the cage (112) just before the service interruption from the condition of the running signal (RUN). When the cage (112) is stopped at the time of the service interruption, there is not any deviation between the data for the floor memorized in the latch circuit (126') and the actual cage position. Therefore, the data are input and memorized in RAM (120) as the data for the present floor (FSY). When the cage (112) is running just before the service interruption, there is a possibility that the data for the floor memorized in the latch circuit (126') are deviated from the actual cage position. When the service interruption is released, the cage (112) is forcibly run to the bottom floor (101) and the data for the bottom floor memorized in ROM (119) are memorized as the data for the present floor (FSY) in RAM (120) and are also memorized in the latch circuit (126'). The forcible running for the correction of the deviation is not limited to the bottom floor but can be also the top floor to attain the same effect.

The microprocessor position detector 117 of FIG. 7 operates according to the programings illustrated in FIGS. 9 to 12 which are memorized in the ROM (204).

The step (91) shows that when the computer is connected to a power source (124), initialization is automatically carried out in the next step (92) and interruption pending step (93) is given. The initializing step (92) includes a RAM initializing step (1001), a stack pointer setting step (1002), a status detecting step (1003), an interruption mask releasing step (1004) and a step (1005) of actuating an interruption-period controlling timer.

FIG. 1 is a flow chart showing the status detecting step (1003) in detail. In the step (1101), an operation state signal (122) is input and if "H" level is given, that is, the condition is in automatic operation, the step (1102) is followed, whereas if "L" level is given, that is, the condition is in manual operation, then the step (1103) is followed. In the step (1102), the condition of a floor detector (114) is detected. If the detector is not operated, the flag ABN is set to "1" in the step (1104). When the floor detector (114) is actuated or in manual operation, data stored in a memory element (126) are input to write in a given address of a RAM (205) as present floor (FSY) in accordance with the step (1103). That is, when the operation mode in an abnormal state is manual operation or automatic operation and the floor detector (114) is actuated, data of the memory element (126) are considered to be correct.

Figure 12:
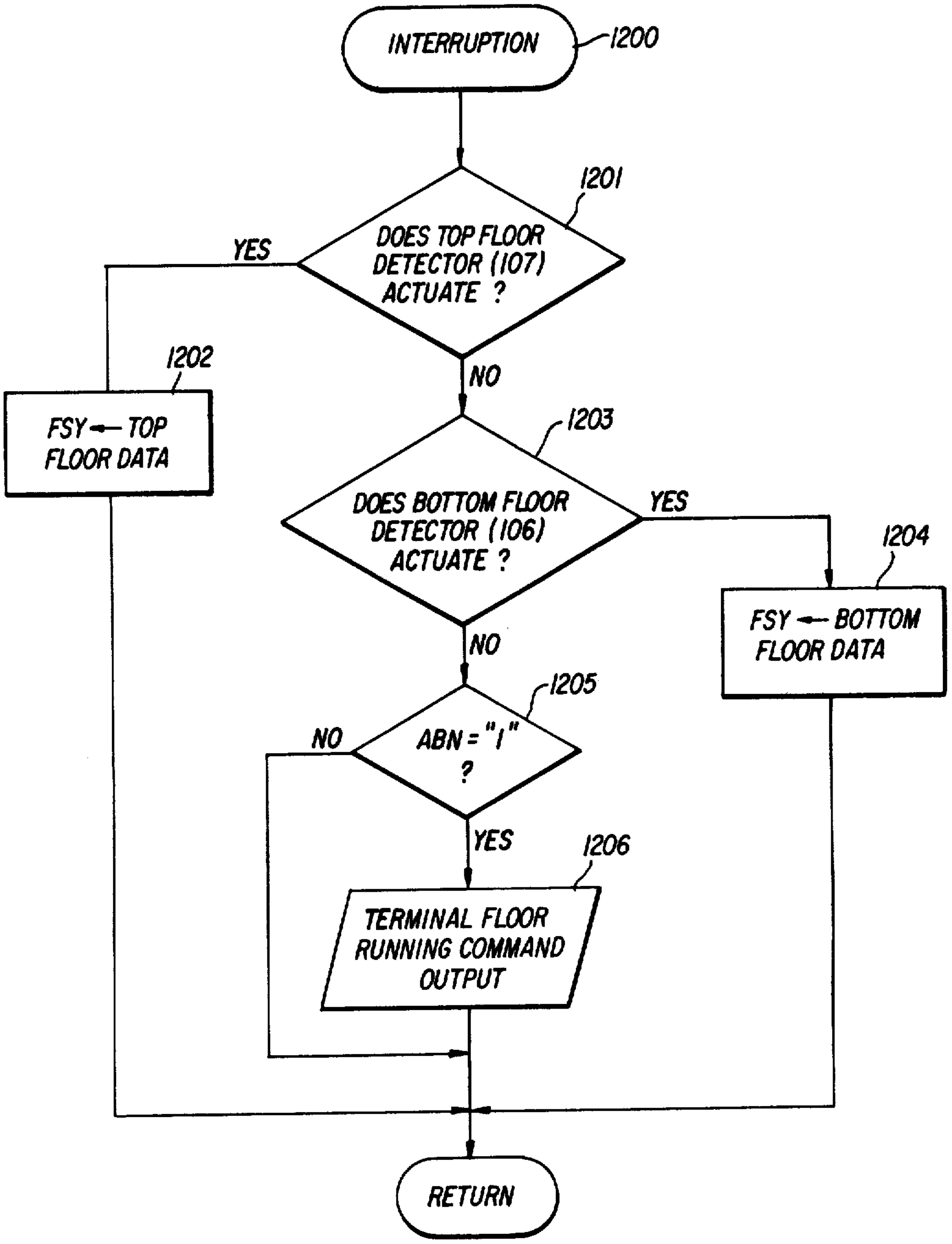

The step (1200) in FIG. 12 shows that the following program is carried out by the interruption from the timer (203). In the step (1201), actuation of a top floor detector (107) is detected. When it is actuated, the cage (112) is in the top floor. Accordingly, top floor data is read out in the step (1202) to be written as present floor FSY. When the top floor detector (107) is not operated, actuation of a bottom floor detector (106) is detected in the next step (1203). If it is actuated, the cage is in the bottom floor whereby the bottom floor data are read out from a TOM (204) in the step (1204) to be written as present floor FSY. Non-actuation of the bottom floor detector (106) indicates that the cage (112) is in the middle floor. In this case, the content of the flag ABN is checked in the step (1205). When "1" level is given, that is, the content of the memory element (126) is impossible to execute, a terminal slowdown command is output to a control device (208) in the step (1206) to forcibly stop the cage (112) thereby setting FSY at the terminal floor through the steps (1201) to (1204).

We claim:

1. A cage position detecting apparatus for operating the present position of the cage by a computer, an improvement comprising;

an emergency power source for feeding the power in an abnormal state such as the service interruption of the main power source;

a memory device which is actuated by the emergency power source to memorize the present position of the cage;

processing means for operating the data for the present position of the cage to determine the use or nonuse of the data for the position of the cage memorized in the memory device depending upon the condition at the time of the abnormal state;

position detector which is placed in a hatchway to output a signal corresponding to the final floor when the cage is at the final floor;

read only memory memorizing the data for the final floor;

said processing means further processing the data for the final floor in said read only memory corresponding to the final floor as the operated present position when the position detector outputs the signal and determining the use or non-use of the data for the position memorized in said memory device depending upon the condition at the time of the abnormal state;

a running control circuit which allows the running of the cage to the final floor depending upon the determination of the non-use of the data of said memory device by said processing means operating the data, and wherein said processing means for operating the data receives an indication of whether the cage is in an automatic operation or a manual operation at the time of the abnormal state after releasing the abnormal state of the main power source and wherein said processing means receives the data indicating whether the cage is between two floors or is at a floor position to thereby determine whether the cage is running at the time of the abnormal state to determine whether the data of the memory device can be used.

2. The cage position detecting apparatus according to claim 1 wherein the processing means determines that the cage is running at the time of the abnormal state to determine the non-use of the data of the memory device when the cage is in an automatic operation and the cage position is between two floors; whereas it determines that the cage is stopping at the time of the abnormal state to determine the use of the data of the memory device when the cage is in the automatic operation and the cage position is at the floor.

3. The cage position detecting apparatus according to claim 1 wherein the processing means determine the use of the data of the memory device when it receives the data that the cage is in the manual operation at the time of the abnormal state.

* * * * *